(12) United States Patent
So et al.

(10) Patent No.: US 11,349,768 B2
(45) Date of Patent: May 31, 2022

(54) METHOD AND DEVICE FOR UNICAST-BASED MULTIMEDIA SERVICE

(71) Applicant: Samsung Electronics Co., Ltd., Suwon-si (KR)

(72) Inventors: Young-Wan So, Gunpo-si (KR); Dong-Yeon Kim, Seoul (KR); Jae-Hyeon Bae, Seoul (KR); Hyun-Koo Yang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/757,218

(22) PCT Filed: Oct. 19, 2018

(86) PCT No.: PCT/KR2018/012438
§ 371 (c)(1),
(2) Date: Apr. 17, 2020

(87) PCT Pub. No.: WO2019/078682
PCT Pub. Date: Apr. 25, 2019

(65) Prior Publication Data
US 2021/0194818 A1 Jun. 24, 2021

(30) Foreign Application Priority Data
Oct. 19, 2017 (KR) .................. 10-2017-0136127

(51) Int. Cl.
*H04L 1/08* (2006.01)
*H04L 47/283* (2022.01)
(Continued)

(52) U.S. Cl.
CPC ............ *H04L 47/283* (2013.01); *H04L 1/205* (2013.01); *H04L 43/087* (2013.01); *H04L 47/30* (2013.01); *H04L 65/80* (2013.01)

(58) Field of Classification Search
CPC ... H04L 65/80; H04L 12/1868; H04L 12/189; H04L 12/56; H04L 1/0002; H04L 1/0033; H04L 1/0041; H04L 1/0045; H04L 1/0057; H04L 1/0058; H04L 1/0075; H04L 2001/0096; H04L 43/106; H04L 47/10;
(Continued)

(56) References Cited

U.S. PATENT DOCUMENTS 5,534,937 A * 7/1996 Zhu .................. H04N 21/23406
348/467
6,377,931 B1 * 4/2002 Shlomot ................ G10L 21/04
369/44.32
(Continued)

FOREIGN PATENT DOCUMENTS

WO 2017/065520 A1 4/2017

*Primary Examiner* — Phuc H Tran
(74) *Attorney, Agent, or Firm* — Jefferson IP Law, LLP (57) ABSTRACT

A method for transmitting multimedia according to the present disclosure comprises: a step of transmitting a first message including fixed delay information and buffer information with respect to a receiving device; and a step of transmitting a packet relating to the multimedia and including a transmission time stamp, wherein a first packet is sent out from a digital buffer of the receiving device at a time determined by adding up the transmission time stamp and the fixed delay information.

12 Claims, 9 Drawing Sheets

(51) Int. Cl.
*H04L 1/20* (2006.01)
*H04L 43/087* (2022.01)
*H04L 47/30* (2022.01)
*H04L 65/80* (2022.01)

(58) Field of Classification Search
CPC ..... H04L 47/22; H04L 47/2416; H04L 47/30; H04L 47/801; H04L 49/90; H04L 65/4069; H04L 65/4076
See application file for complete search history.

(56) References Cited

U.S. PATENT DOCUMENTS

| | | | |
|---|---|---|---|
| 6,744,782 B1* | 6/2004 | Itakura | H04L 12/5601 370/395.6 |
| 7,733,919 B2* | 6/2010 | Liu | H04N 21/8547 370/516 |
| 8,472,484 B2* | 6/2013 | Sugai | H04L 49/109 370/516 |
| 2004/0240438 A1* | 12/2004 | Grossman | H04L 45/121 370/389 |
| 2006/0007960 A1* | 1/2006 | Liu | H04N 21/8547 370/503 |
| 2006/0104279 A1* | 5/2006 | Fellman | H04L 12/2854 370/392 |
| 2006/0291386 A1* | 12/2006 | Jyske | H04L 65/80 370/230 |
| 2010/0085886 A1* | 4/2010 | Okada | H04L 43/0852 370/252 |
| 2010/0296476 A1* | 11/2010 | Li | H04N 21/41407 370/329 |
| 2012/0324520 A1* | 12/2012 | Van Deventer | H04L 65/80 725/109 |
| 2015/0281770 A1 | 10/2015 | Lim et al. | |
| 2016/0036564 A1* | 2/2016 | Krishnan | H04L 1/1835 714/748 |
| 2016/0164943 A1* | 6/2016 | Walker | H04N 21/26216 709/219 |
| 2016/0308791 A1* | 10/2016 | Subasingha | H04L 43/106 |
| 2017/0163373 A1 | 6/2017 | Hwang et al. | |
| 2018/0310139 A1 | 10/2018 | Yang et al. | |
| 2019/0364082 A1* | 11/2019 | Bouazizi | H04L 65/4084 |

* cited by examiner

METHOD AND DEVICE FOR UNICAST-BASED MULTIMEDIA SERVICE

CROSS-REFERENCE TO RELATED APPLICATION(S)

This application is a National Phase Entry of PCT International Application No. PCT/KR2018/012438, which was filed on Oct. 19, 2018, and claims priority under 35 U.S.C. § 119 of Korean Patent Application No. 10-2017-0136127, filed on Oct. 19, 2017 in the Korean Intellectual Property Office the disclosure of which is incorporated herein by reference in its entirety.

BACKGROUND

The disclosure relates to a method and apparatus for transmitting and receiving a signal, which support real-time media transmission in a system that provides multimedia service to multiple users in a unicast-based transmission scheme.

DESCRIPTION OF THE RELATED ART

In the $21^{st}$ century's information society, multimedia services are entering an era of full-fledged high quality and personalization. In particular, with the recent commercialization of a communication system capable of delivering high-quality media data to personal devices, such as $4^{th}$ generation (4G) long term evolution (LTE), a unicast-based multimedia transmission system may transmit media of the same quality as conventional broadcasts in real time.

Accordingly, there is a demand for a method of supporting synchronized playback between devices to provide the same user experience as in a real-time broadcasting system in a unicast-based multimedia transmission system.

The above information is presented as background information only to assist with an understanding of the disclosure. No determination has been made, and no assertion is made, as to whether any of the above might be applicable as prior art with regard to the disclosure.

SUMMARY

An embodiment of the disclosure provides a method and apparatus for providing a unicast-based multimedia service which supports synchronization between devices.

An embodiment of the disclosure provides a method and apparatus for changing a transmission mode, which minimize a service access time in a unicast-based multimedia service supporting synchronization between devices.

An embodiment of the disclosure provides a method and apparatus for managing a buffer, which minimize a service access time in a unicast-based multimedia service supporting synchronization between devices.

An embodiment of the disclosure provides a method and apparatus for managing a buffer, which reduce the size of a buffer in a device using a unicast-based multimedia service.

In accordance with an embodiment of the present disclosure, a method of transmitting multimedia includes transmitting a first message including buffer information about a reception apparatus and fixed delay information, and transmitting a packet related to the multimedia and including a transmission time stamp. The packet is output from a de-jitter buffer of the reception apparatus at a time calculated by adding the transmission time stamp and the fixed delay information.

In accordance with an embodiment of the present disclosure, an apparatus for transmitting multimedia includes a transceiver configured to transmit a first message including buffer information about a reception apparatus and fixed delay information and transmit a packet related to the multimedia and including a transmission time stamp, and a controller coupled to the transceiver and configured to control the transceiver. The packet is output from a de-jitter buffer of the reception apparatus at a time calculated by adding the transmission time stamp and the fixed delay information.

In accordance with an embodiment of the present disclosure, a transmission apparatus includes a media data generator configured to generate multimedia content, a packet generator configured to packetize the generated media data, and a packet transmitter configured to transmit packets. The packet transmitter is configured to determine a packet transmission mode in consideration of an access time of a user equipment (UE) and an available data rate, and generate signaling based on the determined packet transmission mode.

DETAILED DESCRIPTION

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior, as well as future uses of such defined words and phrases.

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the literary meanings, but, are merely used by the inventor to enable a clear and consistent understanding of the disclosure. Accordingly, it should be apparent to those skilled in the art that the following description of exemplary embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term as used in the disclosure, "$1^{st}$", "$2^{nd}$", "first" or "second" may be used for the names of various components, not limiting the components. These expressions are used to distinguish one component from another component. For example, a first component may be referred to as a second component and vice versa without departing the scope of the disclosure. As used herein, the term "and/or" includes any and all combinations of one or more associated items.

The terms used in this application merely are for the purpose of describing particular embodiments and are not intended to limit the disclosure. Singular forms are intended to include plural forms unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the disclosure belongs. Such terms as those defined in a generally used dictionary are to be interpreted to have the meanings equal to the contextual meanings in the relevant field of art.

An electronic device according to various embodiments of the disclosure may include a communication function. For example, an electronic device may be any of a smartphone, a tablet personal computer (PC), a mobile phone, a video phone, an e-book reader, a desktop PC, a laptop PC, a netbook PC, a personal digital assistant (PDA), a portable multimedia player (PMP), an MP3 player, mobile medical equipment, a camera, or a wearable device (e.g., a head-mounted device (HMD)), electronic clothes, an electronic bracelet, an electronic necklace, an electronic appcessory, an electronic tattoo, and a smart watch.

According to some embodiments of the disclosure, an electronic device may be a home appliance equipped with a communication function. The home appliance may be any of a television, a digital versatile disk (DVD) player, an audio player, a refrigerator, an air conditioner, a vacuum cleaner, an oven, a microwave oven, a washer, a drier, an air purifier, a set-top box, a TV box (e.g., Samsung HomeSync™, Apple TV™, or Google TV™), a gaming console, an electronic dictionary, a camcorder, and an electronic picture frame.

According to various embodiments of the disclosure, an electronic device may be any of a medical device (e.g., a magnetic resonance angiography (MRA) device, a magnetic resonance imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., a naval navigation device, a gyrocompass, or a compass), an avionic electronic device, a security device, an industrial or consumer robot, and so on.

According to various embodiments of the disclosure, an electronic device may be any of furniture, part of a building/structure, an electronic board, an electronic signature receiving device, a projector, and various measuring devices (e.g., a water, electricity, gas or electro-magnetic wave measuring device) which have a communication function.

According to various embodiments, an electronic device may be one or a combination of two or more of the foregoing devices. It would be obvious to those skilled in the art that an electronic device according to a preferred embodiment of the disclosure is not limited to the foregoing devices.

It is apparent that a proposed apparatus and method according to an embodiment of the disclosure are applicable to mobile broadcasting services including digital multimedia broadcasting (DMB), digital video broadcasting-handheld (DVB-H), and advanced television systems committee-mobile/handheld (ATSC-M/H), a digital video broadcasting system such as Internet protocol television (IPTV), communication systems including an MPEG media transport (MMT) system, an evolved packet system (EPS), a long term evolution (LTE) mobile communication system, an LTE-advanced (LTE-A) mobile communication system, a high-speed downlink packet access (HSDPA) mobile communication system, a high-speed uplink packet access (HSUPA) mobile communication system, a $3^{rd}$ generation partnership project 2 (3GPP2) wideband code division multiple access (WCDMA) mobile communication system, a 3GPP2 code division multiple access (CDMA) mobile communication system, and an institute of electrical and electronics engineers (IEEE) 802.16m communication system, and various other communication systems such as Mobile IP.

Figure 1A:
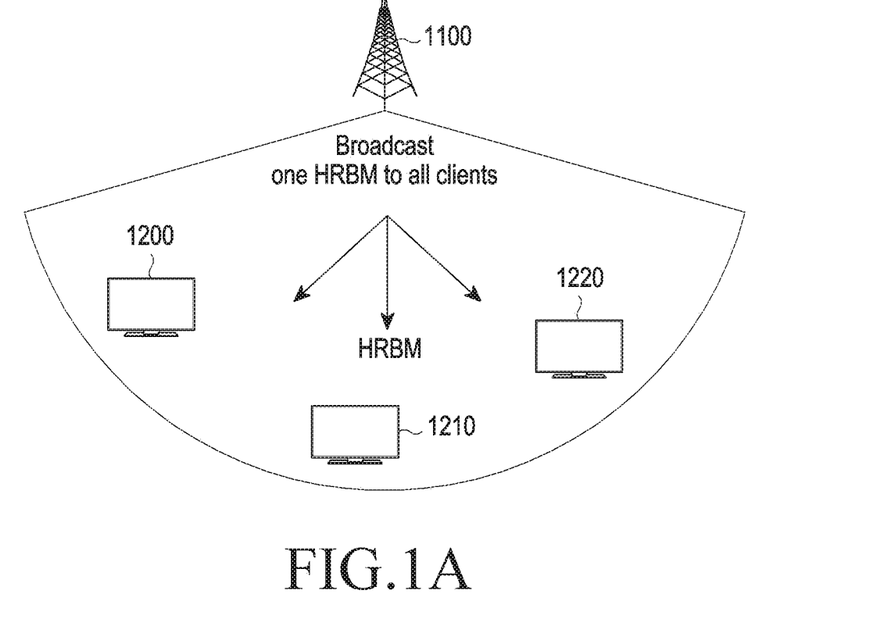
FIGS. 1a and 1b are schematic diagrams illustrating the configuration of a system supporting a synchronized real-time multimedia service according to an embodiment of the disclosure.
Figure 1B:
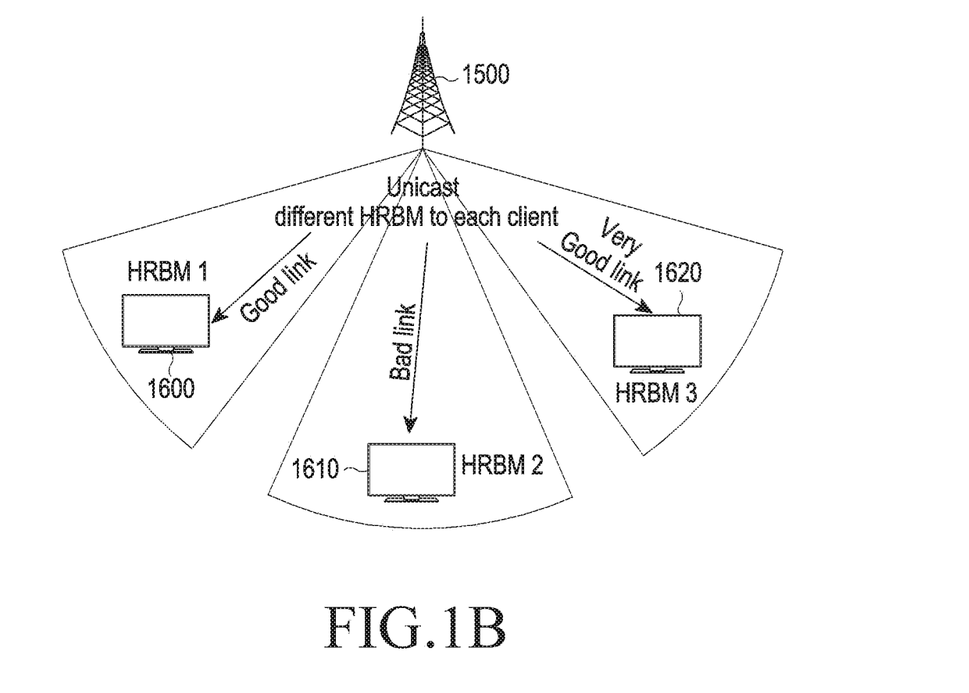

FIGS. 1a and 1b are schematic diagrams illustrating the configuration of a system supporting a synchronized real-time multimedia service according to an embodiment of the disclosure.

Referring to FIG. 1a, a multimedia server 1100 provides a multimedia service to three UEs 1200, 1210, and 1220. A multimedia service supporting synchronization between devices means that even when different UEs access the service at different time points, all of the UEs accessing the service reproduce the same time point of the service at the same absolute time. The multimedia server 1100 transmits media data to each of the UEs 1200, 1210, and 1220 by a broadcast-based transmission protocol, and each UE accesses media data transmitted by the multimedia server 110 at a different time point. The broadcast-based transmission protocol may be, for example, an MPEG media transport protocol (MMTP) defined in ISO/IEC 23008-1 MPEG media transport (MMT), and the media data may be transmitted encapsulated in, for example, a media processing unit (MPU) format defined in ISO/IEC 23008-1 MMT. When the multimedia server 1100 transmits media data to the UEs 1200, 1210, and 1220 by the broadcast-based transmission protocol, the transmission environment is simple and thus one hypothetical receiver buffer model (HRBM) may be applied to all of the UEs 1200, 1210, and 1220.

Referring to FIG. b, when a multimedia server 1500 provides a multimedia service to three UEs 1600, 1610, and 1620 and the communication environment is good, the multimedia server 1500 transmits media data and a signaling message to each individual UE by a unicast-based transmission protocol, and the UE accesses the multimedia server 1500 independently at a different time. The unicast-based transmission protocol may be, for example, the MMTP defined in ISO/IEC 23008-1 MMT, and the media data may be transmitted encapsulated in, for example, an MPU format defined in ISO/IEC 23008-1 MMT. The multimedia server 1500 provides the media service by transmitting multimedia data and a signaling message individually to the UEs 1600, 1610, and 1620. As the transmission environment becomes diverse, different HRBMs may be applied to the UEs 1600, 1610, and 1620.

Figure 2:
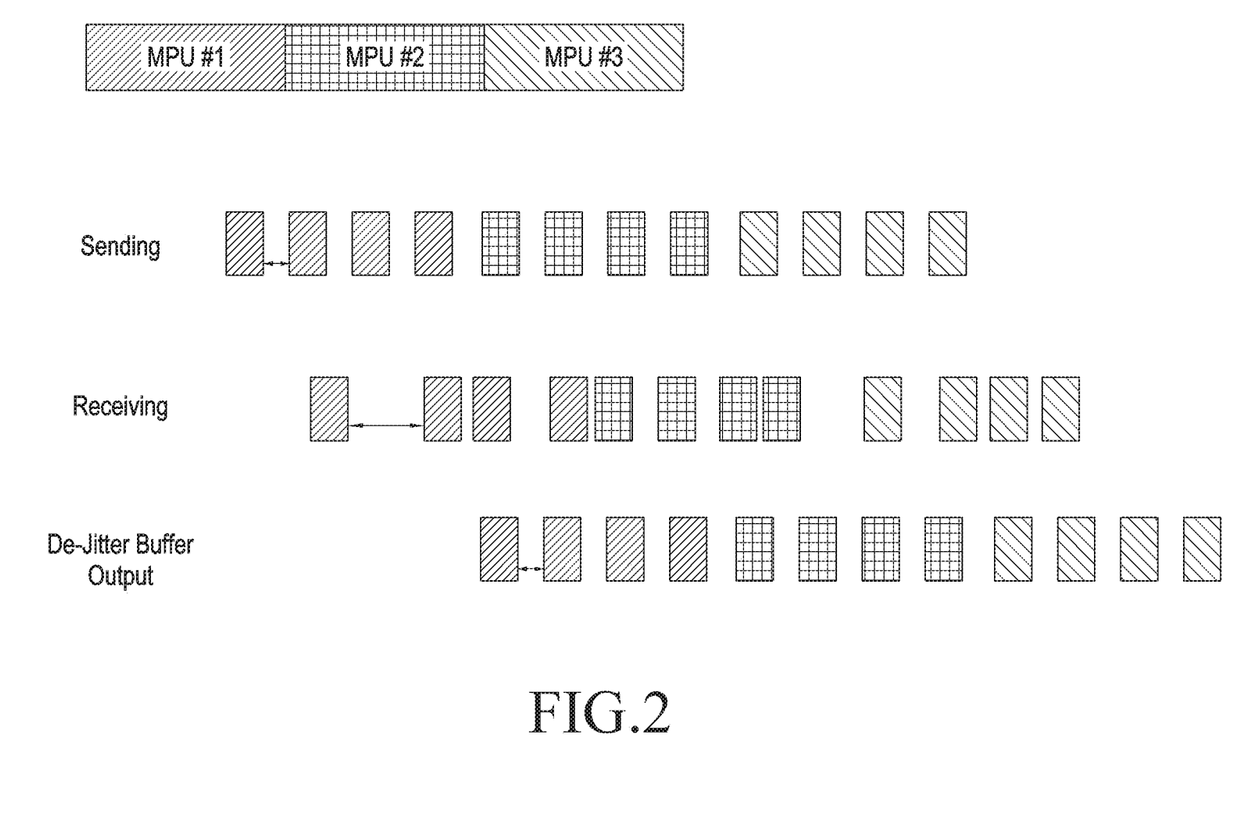
FIG. 2 is a schematic diagram illustrating packet transmission and reception timings according to an embodiment of the disclosure.

FIG. 2 is a schematic diagram illustrating packet (PKT) transmission and reception timings according to an embodiment of the disclosure.

In FIG. 2, it is assumed that a multimedia server transmits an MPU with multimedia data encapsulated therein by the MMTP, and a UE receives the multimedia data by the MMTP. Referring to FIG. 2, the multimedia server divides media data into a plurality of independent segments and encapsulates each of the segments in an MPU. Then, the MPUs may be packetized in one or more MMTP packets and transmitted at the same time interval by the MMTP. Even though the multimedia server transmits the MMTP packets at the same time interval, a receiver may receive the packets at changed intervals due to fixed and variable features of an intermediate network. The change of the reception interval is called network jitter. The presence of the jitter may cause buffer overflow/underflow. The MMTP absorbs the jitter at a transport protocol level by using a de-jitter buffer so that a transmission network becomes a network having a logically fixed delay. Parameters for operating the de-jitter buffer are transmitted by MMT signaling, which will be described later in detail. While it is assumed in the foregoing embodiment, for the convenience of description, that a multimedia server transmits MMTP packets at the same time interval, the time interval may vary depending on the configuration and implementation of a service, which will not be described herein because it has no relation to the subject matter of the disclosure.

Further, while FIG. 2 illustrates only the process of packetizing and transmitting media data, a process of exchanging control information for service access and reproduction in addition to media data is required.

While the multimedia server is shown as transmitting MMT packets at the same time interval in the embodiment of FIG. 2, for the convenience of description, it is obvious that the MMT packets may be transmitted at different time intervals in real implementation.

In the embodiment illustrated in FIG. 2, the transmission and reception timings after MPUs are generated are shown on the assumption that a session has already been connected between the multimedia server and the UE. In real implementation, since UEs access the multimedia server at any time points, the multimedia server should control a transmission timing in consideration of an access time of each UE and an MPU generation time.

Figure 3:
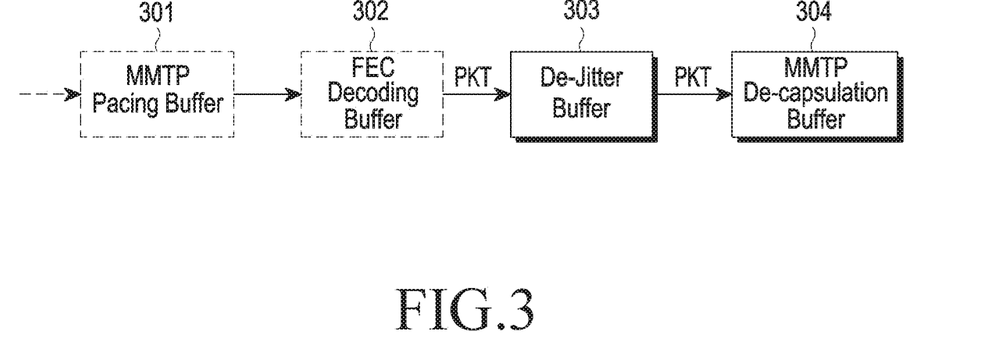
FIG. 3 is a block diagram illustrating a buffer structure in a receiving user equipment (UE) using the MPEG media transport protocol (MMTP) according to an embodiment of the disclosure.

FIG. 3 is a block diagram illustrating a buffer structure in a receiving UE using the MMTP according to an embodiment of the disclosure.

Referring to FIG. 3, a received packet first passes through a pacing buffer 301. The pacing buffer 301 is a buffer that receives a packet and temporarily stores the packet in case the network environment is poor. A forward error correction (FEC) decoding buffer 302 in the next stage is a buffer that stores packets until receiving a predetermined number of packets for which errors are correctible, when packet loss occurs. A de-jitter buffer 303 in the next stage is a buffer that absorbs jitter such that each packet experiencing an irregular network delay may be transferred to the next media processing end at a constant interval. Finally, an MMTP de-capsulation buffer 304 is a buffer that removes header information from a received MMTP packet and transfers only pure media data to the next media processor. Among the plurality of buffers, the other buffers except for the de-jitter buffer 303 may be omitted.

Figure 4:
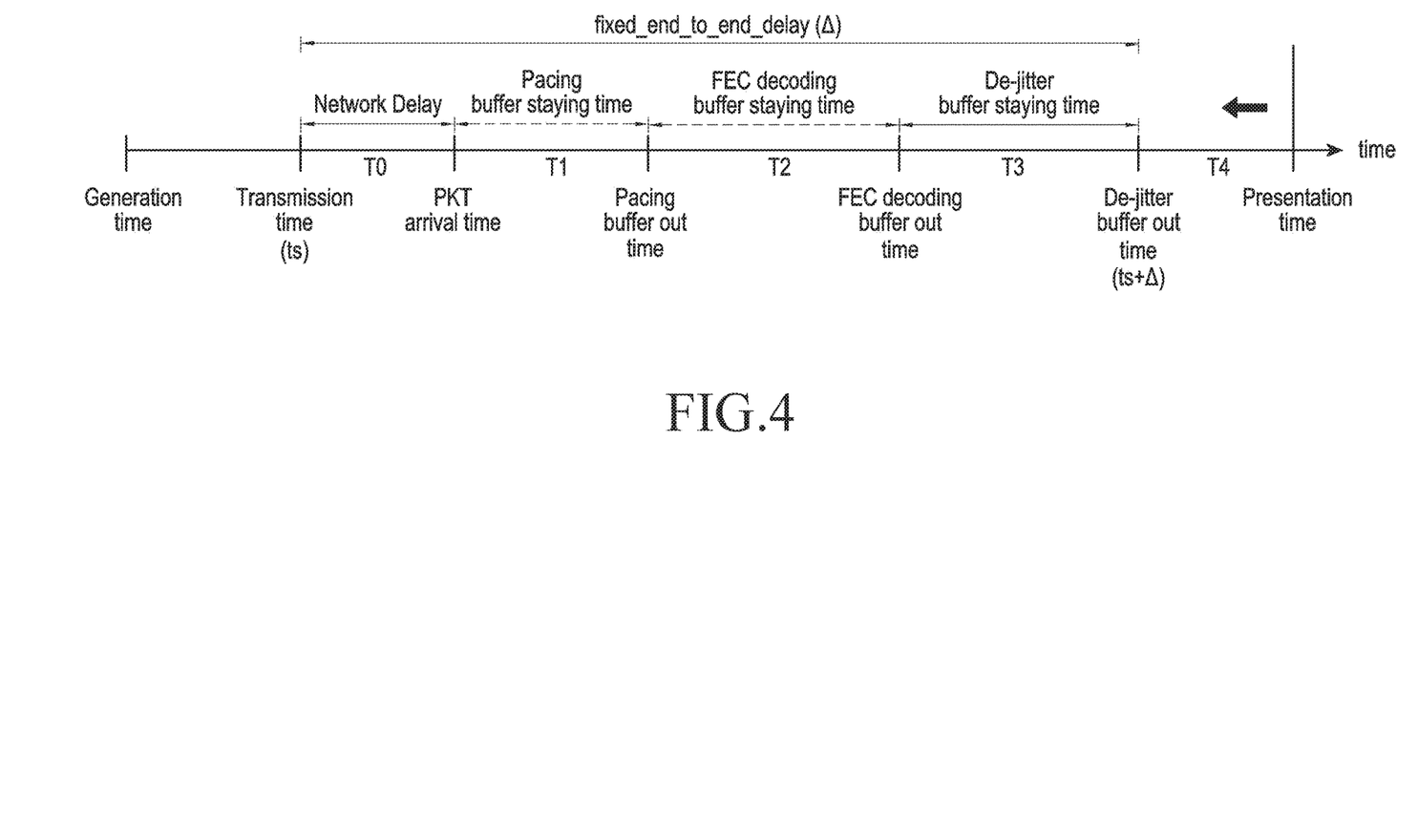
FIG. 4 is a schematic diagram illustrating a relationship between the buffering timings and presentation time of a packet according to an embodiment of the disclosure.

FIG. 4 is a schematic diagram illustrating a relationship between the buffering timings and presentation time of a packet according to an embodiment of the disclosure.

Referring to FIG. 4, an MPU is generated as an MMT packet (generation time), and then transmitted to a receiver (transmission time ts). Herein, the header of the transmitted MMTP packet is marked with the packet transmission time ts. The transmitted packet experiences a network delay T0 during transmission over a network and initially arrives at the receiver (PKT arrival time). The received packet enters a pacing buffer, stays in the pacing buffer for a certain time (pacing buffer staying time T1), and then is output from the pacing buffer (pacing buffer out time). After the packet stays in an FEC buffer in the next stage for a certain time (FEC decoding buffer staying time T2), the packet is output to the next stage (FEC decoding buffer out time). Similarly, the packet stays in a de-jitter buffer for a certain time (de-jitter buffer staying time T3) and then is output to the following media processing end (de-jitter buffer out time). Then, actual media are reproduced at a presentation time which is a time for rendering the media. Herein, a final time fixed_end_to_end_delay (A) from the media transmission time ts to the de-jitter buffer out time is controlled to be constant. This value is transmitted in an HRBM message to the receiver by the MMTP. The de-jitter buffer out time is the sum (ts+Δ) of the MMT packet transmission time (ts) and fixed_end_to_end_delay (Δ). To make the de-jitter buffer out time constant, buffer staying times are adjusted for each packet. Among the plurality of buffers, the other buffers except for the de-jitter buffer 303 may be omitted, and thus delays in the buffers may also be eliminated. Even though one or more of the plurality of buffers are omitted, the final time fixed_end_to_end_delay (Δ) taken for media to be output from the de-jitter buffer after the transmission time ts is maintained constant.

Referring to FIG. 4, the smaller the de-jitter buffer out time (ts+Δ) which is a time of output from the final end buffer, de-jitter buffer, the smaller the presentation time which is the media rendering time. This is a method of controlling fixed_end_to_end_delay (Δ) to be smaller, which means that the real-time performance of media playback may be improved. In addition, unlike a broadcasting environment in which a media transmission channel environment and method are static, a network state changes in the Internet environment, and whether FEC is applied to a specific media channel and whether a pacing buffer are subject to frequent change. Therefore, it is expected that there will be frequent situations in which the value of an HRBM message needs to be changed for efficient media transmission.

The structure of an HRBM message as defined in the MMT standard is illustrated in the following Table 1.

TABLE 1

| Syntax | No. of bits |
| --- | --- |
| HRBM( ) { | |
|   message_id | 16 |
|   version | 8 |
|   length | 16 |
|   max_buffer_size | 32 |
|   fixed_end_to_end_delay | 32 |
|   max_transmission_delay | 32 |
| } | | message_id: an ID identifying the HRBM message
version: the version of the HRBM message
length: the length of the HRBM message in bytes (from the byte following the Length field to the last byte of the HRBM message)
max_buffer_size: a maximum de-jitter buffer (DJB) size in bytes
fixed_end_to_end_delay: fixed_end_to_end_delay between a transmitter and a receiver
max_transmission_delay: max_transmission_delay between the transmitter and the receiver max_transmission_delay is a maximum transmission delay which is expected and allowed between a multimedia server and a UE.

fixed_end_to_end_delay may be a value obtained by adding an additional buffer time for AL-FEC to max_transmission_delay when AL-FEC is applied.

max_buffer_size is calculated as follows.

max_buffer_size=(maximum delay−minimum delay)*maximum bitrate

Figure 5:
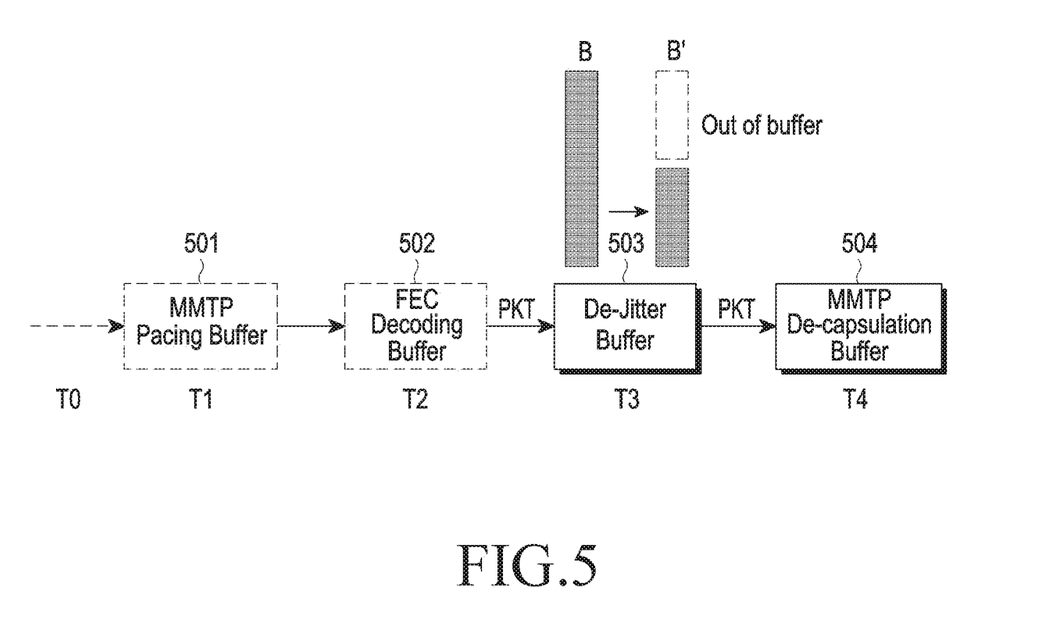
FIG. 5 is a diagram illustrating a phenomenon which occurs in a de-jitter buffer in a UE, when a multimedia server transmits a changed parameter value in a hypothetical receiver buffer model (HRBM) according to an embodiment of the disclosure.

FIG. 5 is a diagram illustrating a phenomenon occurring in a de-jitter buffer in a UE, when a multimedia server changes and transmits a parameter value (buffer size) in an HRBM according to an embodiment of the disclosure.

Referring to FIG. 5, after receiving an HRBM message from the multimedia server, the UE obtains the size of a de-jitter buffer 503 according to a buffer size max_buffer_size, B indicated in the message, and controls a buffer staying time such that all of received packets have the same fixed_end_to_end_delay value. When the state of the transmission channel is good or a buffer capacity to be secured is small, a new buffer size max_buffer_size, B' may be indicated to the UE by transmitting a new HRBM message, HRBM'. At this time, when the new buffer size is smaller, a relationship that B>B' is established. As the secured capacity of the de-jitter buffer 503 is reduced as indicated by the server, a packet stored in the buffer may be instantaneously lost.

Figure 6:
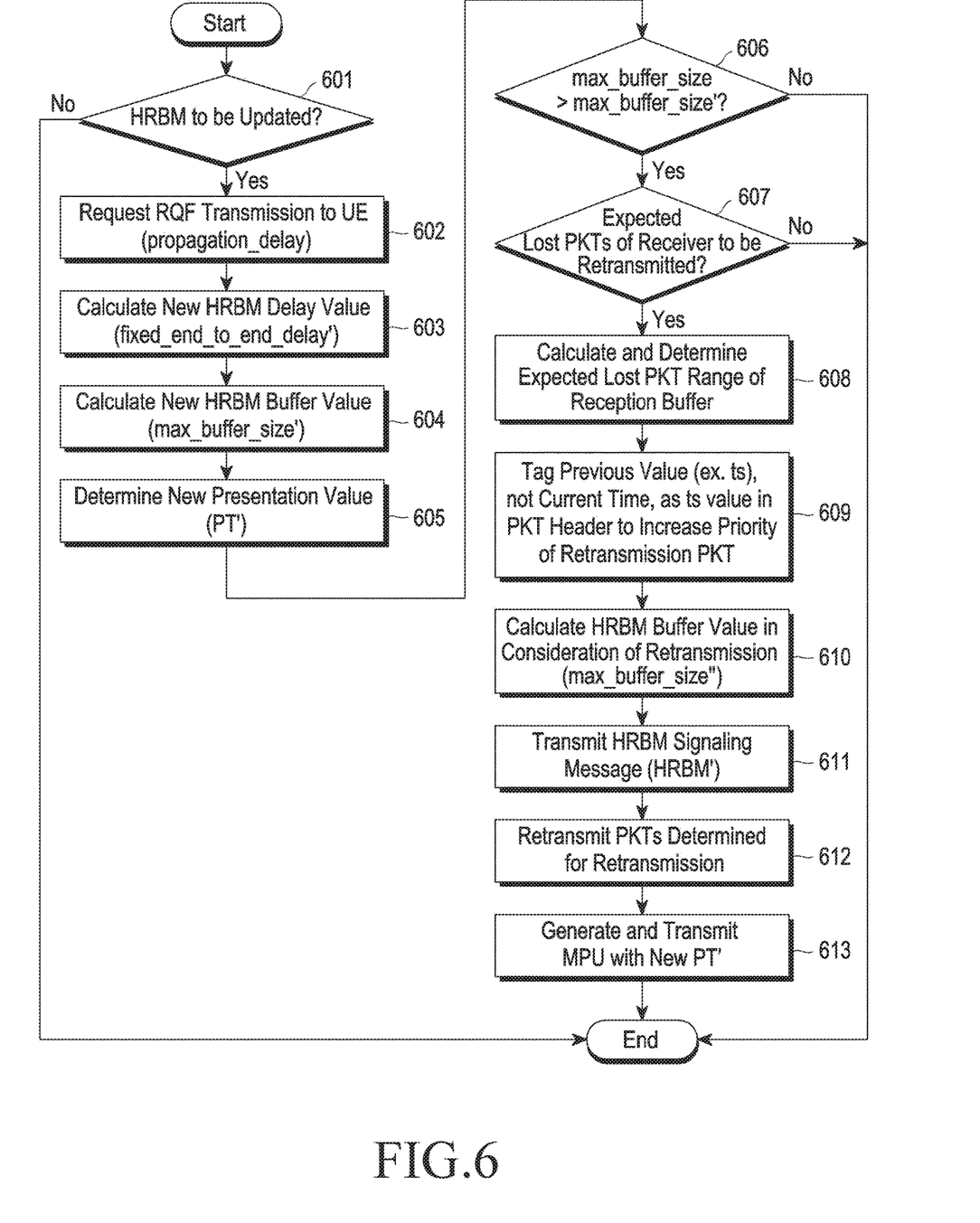
FIG. 6 is a flowchart illustrating an operation of a multimedia server according to an embodiment of the disclosure.

FIG. 6 is a flowchart illustrating an operation of a multimedia server according to an embodiment of the disclosure. The flowchart of FIG. 6 is merely an embodiment. The steps illustrated in FIG. 6 are not compulsory, and a step may be omitted or added. In addition, the steps of FIG. 6 are not necessarily distinguished from each other, and some steps may be integrated and performed simultaneously.

Referring to FIG. 6, when the UE accesses, the multimedia server determines whether to apply a new HRBM value to media transmission for the purpose of real-time rendering performance improvement or buffer capacity reduction by analyzing state information about the network accessed by the UE or analyzing a media presentation time and an effect on a receiver buffer based on decision of a service provider in operation 601. When determining that it is necessary to apply a new HRBM value, the media server transmits an HRBM signaling message with the new HRBM value and then a first MPU. When determining that there is no need to transmit a new HRBM message (update), the multimedia server continues an on-going transmission without any additional operation. The signaling message includes an HRBM message of the MMT.

When determining to update an HRBM value in operation 601, the multimedia server may calculate the new HRBM value in the following procedure.

In order to measure a network delay T0, the server requests the UE to transmit an RQF message in operation 602.

Table 2 RQF message

TABLE 2

| Syntax | No. of bits |
| --- | --- |
| RQF( ) { | |
|   message_id | 16 |
|   Version | 8 |
|   Length | 16 |
|   Message_payload{ | |
|     packet_loss_ratio | 8 |
|     inter_arrival_jitter | 32 |
|     Max_transmission_delay | 32 |
|     Min_transmission_delay | 32 |
|     RTT_parameter( ) { | |
|       propagation_delay | 32 |
|       feedback_timestamp | 32 |
|     } | |
|   } | |
| } | | message_id: an ID identifying the RQF message
version: the version of the RQF message
length: the length of the RQF message in bytes
(from the byte following the Length field to the last byte of the RQF message)
packet_loss_ratio: a packet loss ratio
inter_arrival_jitter: the arrival jitter of a packet
Max_transmission_delay: a maximum transmission delay
Min_transmission_delay: a minimum transmission delay
propagation_delay: a propagation delay until the packet arrives at the receiver. An average transmission delay of packets measured for a predetermined time period
feedback_timestamp: a time at which an RQF feedback is transmitted The server may identify the delay characteristics of the corresponding network channel through the propagation_delay, Max_transmission_delay, and Min_transmission_delay values transmitted through the RQF.

T0=propagation_delay or

T0=[min_transmission_delay to max_transmission_delay]

Target_pacing_buffer_level (in a PSF message) and pacing_buffer_removal_rate (in a PRR message) may be used when the MMTP is used to calculate a pacing buffer staying time, T1, which is the delay that occurs when a received packet first enters and stays in the pacing buffer. The syntaxes and semantics of the PSF and PRR messages are as follows.

Table 3 Pacing buffer status feedback (PSF) message

TABLE 3

| Syntax | No. of bits |
|---|---|
| PSF( ) { | |
|   message_id | 16 |
|   version | 8 |
|   length | 16 |
|   message_payload{ | |
|     num_sub_flow | 8 |
|     for (i=0;i<N;i++) { | |
|       packet_id | 16 |
|       current_pacing_buffer_level | 32 |
|       target_pacing_buffer_level | 32 |
|         last_received | 32 |
|       pacing_buffer_free_space | 32 |
|       } | |
|   } | |
| } | | message_id: an ID identifying the PSF message version: the version of the PSF message length: the length of the PSF message in bytes (from the byte following the Length field to the last byte of the PSF message)

num_sub_flow: the number of subflows packet_id: a packet ID indicating a flow number current_pacing_buffer_level: the current level of the pacing buffer (the current number of packets buffered in the pacing buffer)

target_pacing_buffer_level: a target level of the pacing buffer (a target number of packets to be buffered in the pacing buffer)

last_received: this indicates the last received packet sequence number pacing_buffer_free_space: a residual buffer size of the pacing buffer Table 4 Pacing Buffer Removal Rate (PRR) message

TABLE 4

| Syntax | No. of bits |
|---|---|
| PRR( ) { | |
|   message_id | 16 |
|   version | 8 |
|   length | 16 |
|   message_payload{ | |
|     pacing_buffer_removal_rate | 32 |
|   } | |
|   Reserved | 8 |
| } | | message_id: an ID identifying the PRR message version: the version of the PRR message length: the length of the PRR message in bytes (from the byte following the Length field to the last byte of the PRR message)

pacing_buffer_removal_rate: a rate (bps) at which the pacing buffer transfers a packet to the next stage (e.g., the FEC decoding buffer, when FEC is applied)

In this case, the pacing buffer staying time, T1 which is a delay time during which the received packet initially enters and stays in the pacing buffer, may be calculated by using the values extracted from the two messages as follows. If the pacing buffer is not applied, T1=0.

$$T1 = current\_pacing\_buffer\_level/pacing\_buffer\_removal\_rate$$

In addition, the FEC decoding buffer staying time, T2, which is a time during which the packet stays in the FEC decoding buffer in the next stage, may be derived from a protection_window_time value indicated by an AL-FEC signaling message delivered to the UE. protection_window_time means a maximum period between transmission of an FEC source, a first source of a repair block, or a repair packet and transmission of the FEC source, a last source of the repair block, or the repair packet. T2=0 when AL-FEC is not applied.

$$T2 = protection\_window\_time$$

Finally, the de-jitter buffer staying time, T3 during which the packet stays in the de-jitter buffer in the next stage may be calculated as follows.

$$T3 = fixed\_end\_to\_end\_delay - (T0 + T1 + T2)$$

Based on the calculated information, fixed_end_to_end_delay' and max_buffer_size' to be included in the updated HRBM message may be calculated as follows in operations 603 and 604.

$$fixed\_end\_to\_end\_delay' = T0 + T1 + T2 + T3$$

$$max\_buffer\_size' = (max\_transmission\_delay - min\_transmission\_delay) * max\_bitrate * margin$$

Herein, max_bitrate is a maximum transmission rate of an MMTP packet stream transmitted by the server. In addition, margin refers to an additional margin value given to allow a smooth operation in consideration of a buffer size that may be additionally consumed by the UE due to a retransmission, for example. The margin value may be omitted.

The server generates an updated new HRBM' message using the new parameter values fixed_end_to_end_delay' and max_buffer_size'.

When a smaller fixed_end_to_end_delay' value is applied through the HRBM' message, an earlier presentation time (PT') for the media may be determined to improve real-time processing in operation 605. The server first transmits the HRBM' message and then generates and transmits an MPU to which the earlier presentation time value is applied.

The new buffer size, max_buffer_size', B' becomes smaller such that a relationship B>B' is established. Then, it is determined whether packets stored in a UE buffer are likely to be lost instantaneously due to the reduction of the secured capacity of the de-jitter buffer as indicated by the server. In the embodiment of the disclosure, once the relationship B>B' is established in operation 606, it is determined that the packet loss may occur at the UE, and a packet expected to be lost is transmitted at the request of the UE or at the arbitrary decision of the server in operation 607.

When it is expected that a transmitted packet will be lost due to the buffer size adjustment operation at the UE, interruptions may occur during play of the media. To avoid the interruptions, a process of predicting and preserving packets expected to be lost at the UE is required.

A buffer may be operated in two methods at the UE. One of the methods is first in first out (FIFO) processing in which packets are processed in the order of arrival. The other method is first sent first out (FSFO) processing, in which packets are processed in the order of transmissions regardless of the arrival order of the packets.

According to an embodiment of the disclosure, when a packet is processed in the de-jitter buffer in the FIFO manner, the order in which the packet is transmitted is not related to packet processing in the UE, and packets are stacked, managed, and then output from the buffer in the order of arrival without separate packet rearrangement. In this case, as the buffer size max_buffer_size', B' decreases from B to B'(B>B'), packet loss may occur in the buffer. However, since it is difficult to derive a packet arrival situation in the buffer of the UE, it is favorable to allow the UE to determine a retransmission of the lost packets.

According to another embodiment of the disclosure, when packets are processed in the de-jitter buffer in the FSFO manner, packets are rearranged and stacked in the buffer according to the order in which the packets are transmitted and then output from the buffer. In this case, as the buffer size max_buffer_size', B' decreases from B to B'(B>B'), packet loss may occur in the buffer. However, since it may be derived that packets are buffered and then output in the order of transmissions, the server may predict and retransmit a lost packet without any special help of the UE. In this case, the server calculates and determines a packet range expected to be lost in the reception buffer in operation 608. However, according to an embodiment (e.g., in the FIFO method), the UE may determine a packet range expected to be lost in the reception buffer.

Figure 7:
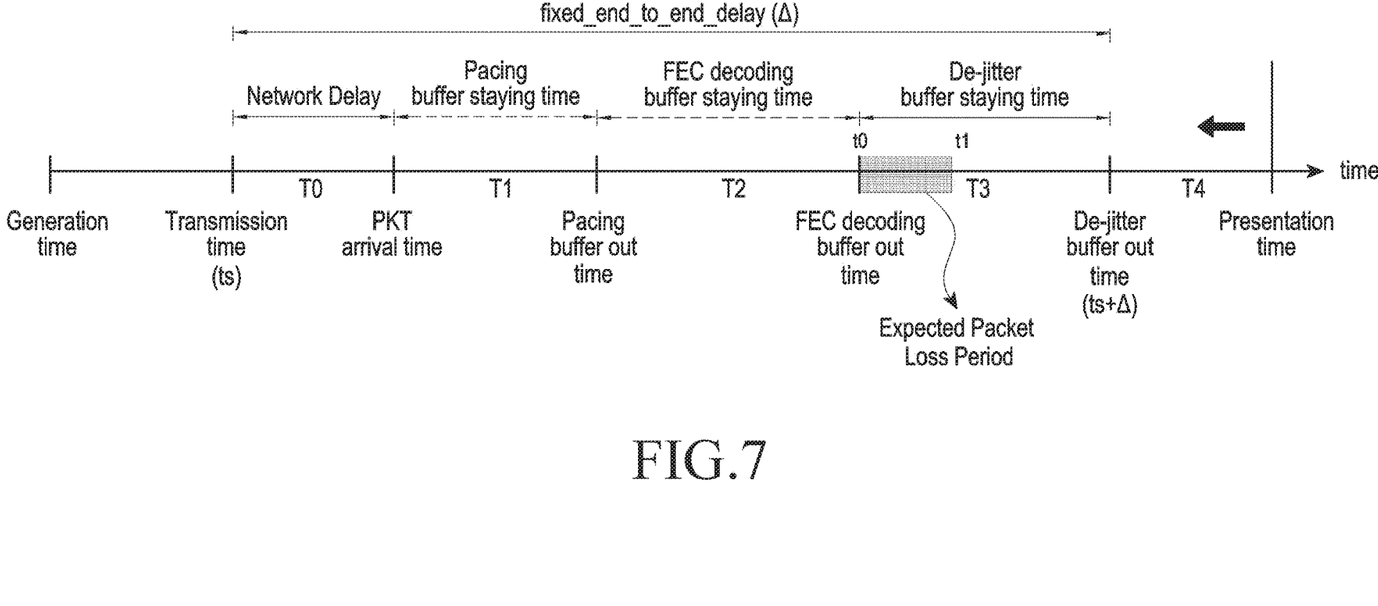
FIG. 7 is a diagram illustrating a range of packets expected to be lost in a UE according to an embodiment of the disclosure.

With reference to FIG. 7, a method of predicting a range of packets expected to be lost at the UE will be described.

FIG. 7 is a diagram illustrating a range of packets expected to have been lost at a UE according to an embodiment of the disclosure. In FIG. 7, a packet generation time to a rendering time, that is, a presentation time is shown along a time axis.

The server first transmits an updated HRBM' message to the UE. Then, it may be predicted that a buffer size will change packet loss will occur after time T0 at which the HRBM' message is received at the UE. Lost packets are among packets transmitted between FEC decoding buffer out time (t0) and the maximum time (t1) of the oldest of packets buffered in a reduced buffer capacity.

Therefore, $t0 = ts + T0 + T1 + T2$; and $t1 = t0 + (B - B')/\text{max\_bitrate} * \text{margin}$.

Herein, max_bitrate is a maximum transmission rate of an MMTP packet stream transmitted by the server. In addition, margin refers to an additional margin value that the server determines to allow a smooth preservation operation at the UE after a retransmission. The margin value may be omitted.

When the server determines packet loss, the server determines that packets with a current packet lifetime (t) satisfying (t0≤t≤t1) among already transmitted packets are highly likely to have been lost, and selects and transmits the packets from among the previously transmitted packets to the UE.

With reference made again to FIG. 6, to enable the receiving UE to identify that the packets are not new media but packets which have already been received but may have been lost and to process the packets fast with priority in the buffer, the server tags a timestamp value earlier than the current time in packet headers on purpose and transmits the packets in operation 609.

For example, an earlier timestamp value may be tagged in the packet header of a packet to be processed with a higher priority. In this example, the time stamp ts of the original packet may be copied in the packet header, for transmission.

According to another embodiment of the disclosure, when the server determines that a retransmitted packet may not arrive at the UE within a meaningful time for such a reason as too a late transmission, the server may not retransmit the packet because this packet may cause an unnecessary storage and process at the UE. That is, unless the following condition is satisfied, the retransmission may be unnecessary and thus skipped.

$ts + \text{propagation\_delay} \leq 5 \text{ fixed\_end\_to\_end\_delay}$ (A)

For the same reason, the UE may not request a retransmission of packets expected to arrive late. This may be configurable by attaching propagation_delay from the server to the UE and arrival_deadline of a specific packet in a message requesting a retransmission of the specific packet. Unless the following condition is satisfied, the server may skip the packet retransmission.

$ts + \text{propagation\_delay} \leq \text{arrival\_deadline}$

Herein, arrival_deadline is an arrival time limit for the specific packet, which is determined by the UE.

Figure 8:
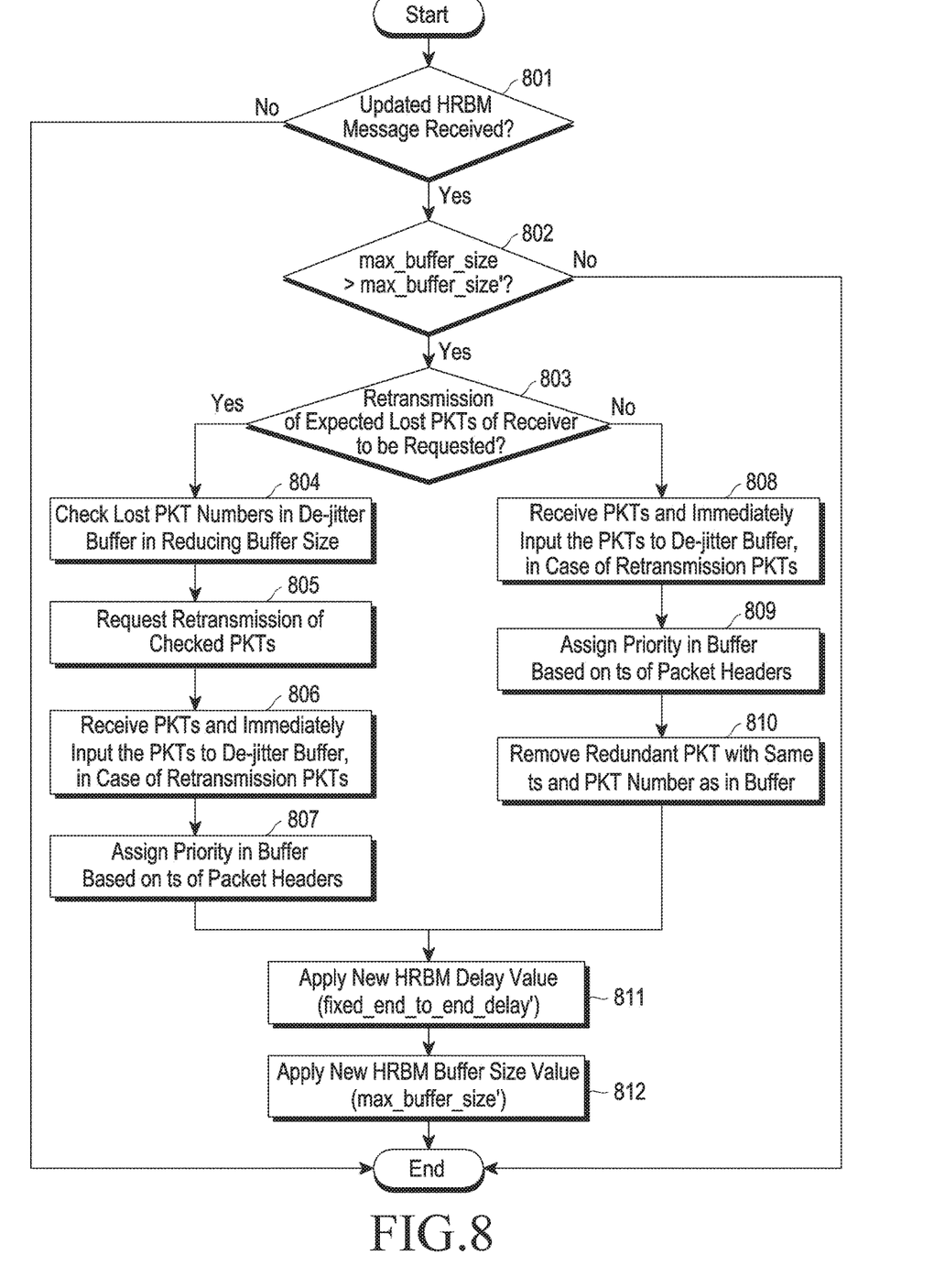
FIG. 8 is a flowchart illustrating an operation of a UE according to an embodiment of the disclosure.

FIG. 8 is a flowchart illustrating an operation of a multimedia UE according to an embodiment of the disclosure. The flowchart of FIG. 8 is merely an embodiment. The steps illustrated in FIG. 8 are not compulsory, and a step may be omitted or added. In addition, the steps of FIG. 8 are not necessarily distinguished from each other, and some steps may be integrated and performed simultaneously.

Referring to FIG. 8, the multimedia UE determines whether an updated new HRBM' message has been received in operation 801. When determining that the new message has been received, if a buffer size max_buffer_size', B' has been decreased from B to B', the UE may expect that packet loss is likely to occur in operation 802.

According to an embodiment of the disclosure, when the UE determines that it is necessary to request a retransmission of packets expected to be lost in a buffer after receiving the HRBM' message, the UE may request the retransmission in operation 803. For this purpose, the UE may check the packet sequence numbers of the packets to be lost due to reduction of a buffer size, before reducing the updated buffer size in operation 804. The UE may request the retransmission to the server, indicating the packets in an ARQ feedback (AF) message in operation 805. When receiving the request for retransmitting the packets, the server may transmit timestamps (ts) of original packets as they are, such that the receiving UE may be aware that the packets are not new media packets but retransmission packets of previously transmitted packets and thus may fast process the packets with priority in the buffer. When the retransmission packets are marked with a current time (ts') instead of the timestamps (ts) of the original packets, the packets unconditionally stay in the UE buffer for the fixed_end_to_end_delay' time and are then transmitted to the media rendering end, thereby making the retransmission meaningless. Accordingly, the packets are tagged with the timestamps ts of the original packets. Once the UE is aware that the received packets are not new media packets but retransmission packets of previously transmitted packets, the UE may input the packets to the de-jitter buffer immediately in order to fast process the packets with priority in operation 806. The priority may be assigned based on the timestamps (ts) in the packet headers in operation 807.

According to another embodiment of the disclosure, the UE may not request the retransmission of the packets expected to be lost in the buffer or may rely on processing (retransmission) of the server in operation 803. The UE should prepare for the case in which the server may retransmit a packet on its own in case of packet loss in packets received after the update HRBM' message is received. For this purpose, since a packet having an earlier ts value among the received packets needs fast processing, the UE places the packet in the buffer based on ts, for faster processing in operation 809. In this process, there may be a packet that the server has redundantly transmitted. Therefore, in the presence of a packet having the same packet number as ts in the buffer, the UE discards the redundant packet without buffering it in the buffer. Then, the UE applies a parameter for a new HRBM' buffer in managing the UE buffer in operations 811 and 812.

Figure 9:
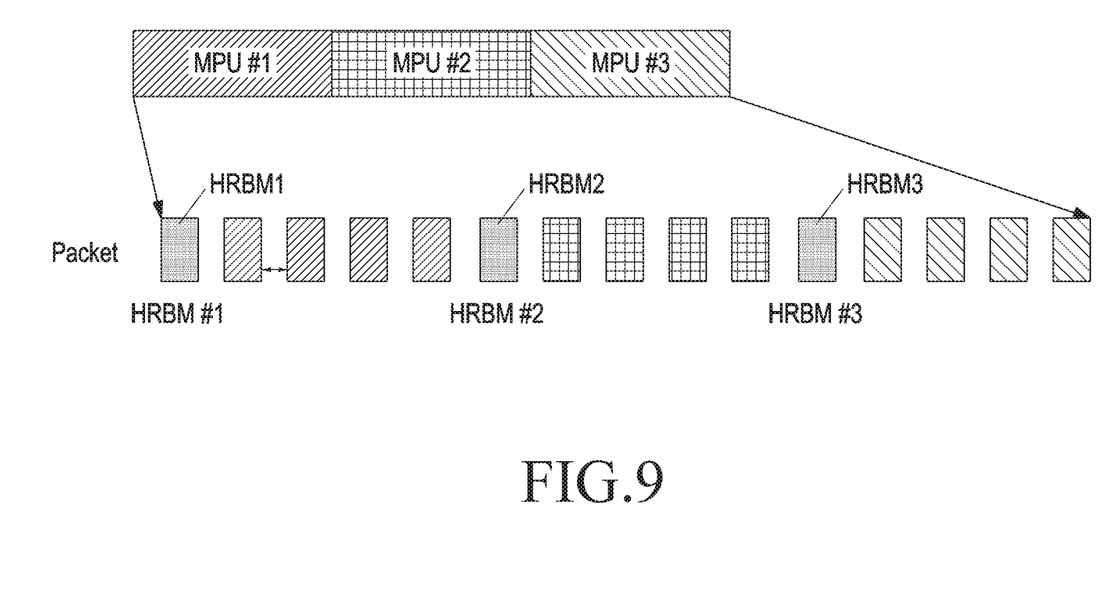
FIG. 9 is a diagram illustrating an operation of updating an HRBM message according to an embodiment of the disclosure.

FIG. 9 is a diagram illustrating an operation of updating an HRBM message according to an embodiment of the disclosure.

Referring to FIG. 9, the HRBM message may be updated on an MPU basis in an embodiment of the disclosure. The updated HRBM message may be transmitted before transmission of the next MPU starts after one MPU is completely transmitted. Upon receipt of the updated HRBM message, the receiver may determine when to apply the updated HRBM message by comparing the transmission time of an MMTP packet header including the HRBM message and the transmission time of an MMTP packet header including each MPU.

In another embodiment of the disclosure, the HRBM message described in Table 1 may further include a field indicating the MPU sequence number of an MPU to which the updated message is to be applied. Further, in embodiments of the disclosure, HRBM parameters refer to max_buffer_size and fixed_end_to_end_delay.

The HRBM operates on an asset basis, with an asset being a media component. When an MMTP packet is received, the MMTP packet is first stored in the de-jitter buffer and output from the de-jitter buffer at a time obtained by adding fixed_end_to_end_delay to the transmission time of the MMTP packet. For example, it is assumed that the server transmits three MMTP packets respectively at 1:00:00, 1:00:10, and 1:00:20 and the three MMTP packets are received respectively at 1:00:03, 1:00:11, and 1:00:22. When fixed_end_to_end_delay of an HRBM message is set to 5 seconds, the de-jitter buffer of the receiver buffers the three MMTP packets and then outputs them respectively at 1:00:05, 1:00:15, and 1:00:25. When the HRBM message is updated, the receiver logically defines a new buffer based on a value included in the new HRBM message, and processes an MMTP packet transmitted after the update time according to the new HRBM.

While it has been described in the above embodiment that only the first HRBM is updated and transmitted, it is also possible to transmit n MPUS after UE access and then transmit MPUs in a normal mode. The afore-described specific parameter values change, which does not impair the subject matter of the disclosure.

Specific aspects of the present disclosure may also be implemented as computer-readable code on a computer-readable recording medium. The computer-readable recording medium is any data storage device capable of storing data that may be read by a computer system. Examples of the computer-readable recording medium include read only memory (ROM), random-access memory (RAM), CD-ROMs, magnetic tapes, floppy disks, optical data storage devices, and carrier waves (such as data transmission over the Internet). The computer-readable recording medium may also be distributed through computer systems connected to a network so that the computer-readable code is stored and executed in a distributed fashion. In addition, functional programs, code, and code segments for implementing the present disclosure may be readily interpreted by those skilled in the art.

It will also be appreciated that the apparatus and method according to one embodiment of the present disclosure may be realized in the form of hardware, software or a combination of hardware and software. Any such software may be, for example, volatile or nonvolatile storage, such as a storage device such as a ROM, whether erasable or rewritable, or a memory such as a RAM, a memory chip, a device or an integrated circuit. Or, for example, CD or DVD, magnetic disk or magnetic tape, and the like may be stored in a storage medium that is optically or magnetically recordable and simultaneously readable by a machine (e.g. computer). It may be understood that the method according to an embodiment of the present disclosure may be implemented by a computer or a portable terminal including a controller and a memory, and the memory is an example of a machine-readable storage medium suitable for storing a program or programs including instructions for implementing embodiments of the present disclosure.

Therefore, the present disclosure includes a program including code for implementing the apparatus or method described in any claim herein and a storage medium readable by a machine (such as a computer) storing such a program. In addition, such a program may be electronically transferred via any medium, such as a communication signal transmitted via a wired or wireless connection, and the present disclosure may include equivalents thereof.

Further, the apparatus according to an embodiment of the present disclosure may receive and store the program from a program providing apparatus connected wiredly or wirelessly. The program providing apparatus includes a memory for storing a program including instructions for causing the program processing apparatus to perform a preset content protection method, information necessary for the content protection method, a communication unit for performing wired or wireless communication with a graphic processing apparatus, and a controller for automatically transmitting the program to the transmission and reception apparatuses, upon request of the graphics processing apparatus or automatically.

While specific embodiments of the present disclosure have been described above, various modifications may be made without departing from the scope of the present disclosure. Therefore, the scope of the present disclosure should not be limited to the described embodiments, but should be defined not only by the scope of the following claims, but also by the equivalents of the claims.

The invention claimed is:

1. A method performed by a transmission apparatus in a communication system, comprising:
   transmitting, to a reception apparatus, a first message including buffer information about the reception apparatus and fixed delay information;
   transmitting, to the reception apparatus, a packet related to multimedia and including a transmission time stamp;
   receiving, from the reception apparatus, a second message including information about a pacing buffer status of the reception apparatus, wherein the pacing buffer status includes information about a current level of the pacing buffer and a target level of the pacing buffer; and receiving, from the reception apparatus, a third message including information about a pacing buffer removal rate of the reception apparatus, wherein the transmission time stamp indicates a first time when the packet is transmitted to the reception apparatus, and wherein the packet received by the reception apparatus is output from a de-jitter buffer of the reception apparatus at a second time calculated based on the transmission time stamp and the fixed delay information.

2. The method of claim 1, further comprising:

receiving a fourth message including transmission quality information from the reception apparatus; and transmitting a fifth message including error correction information about the packet to the reception apparatus, wherein the fourth message includes information about a propagation delay taken for a packet to arrive at the reception apparatus.

3. The method of claim 2, wherein the fixed delay information is estimated based on a network delay, a delay of the pacing buffer, a delay of the de-jitter buffer, and a delay of an error correction buffer of the reception apparatus, and wherein the network delay is estimated based on the information about the propagation delay, the delay of the pacing buffer is estimated by dividing information about a number of packets buffered in the pacing buffer by a packet removal rate of the pacing buffer, and the delay of the error correction buffer is estimated based on the error correction information about the packet.

4. The method of claim 1, further comprising, in case that at least one of the buffer information or the fixed delay information is changed, retransmitting the first message, wherein the buffer information includes information about a required size for the buffer of the reception apparatus.

5. The method of claim 1, further comprising, in case that a required size for the buffer of the reception apparatus is decreased, identifying a packet estimated to be lost in the de-jitter buffer, wherein the buffer information includes information about the required size for the buffer of the reception apparatus.

6. The method of claim 5, further comprising transmitting a retransmission packet of the packet estimated to be lost, the retransmission packet including a same transmission time stamp as included in the packet estimated to be lost.

7. An apparatus in a communication system, comprising:

a transceiver configured to transmit, to a reception apparatus, a first message including buffer information about the reception apparatus and fixed delay information, transmit, to the reception apparatus, a packet related to multimedia and including a transmission time stamp, receive, from the reception apparatus, a second message including information about a pacing buffer status of the reception apparatus, and receive, from the reception apparatus, a third message including information about a pacing buffer removal rate of the reception apparatus; and a controller coupled to the transceiver and configured to control the transceiver, wherein the transmission time stamp indicates a first time when the packet is transmitted to the reception apparatus, wherein the packet received by the reception apparatus is output from a de-jitter buffer of the reception apparatus at a second time calculated based on the transmission time stamp and the fixed delay information, and wherein the pacing buffer status includes information about a current level of the pacing buffer and a target level of the pacing buffer.

8. The apparatus of claim 7, wherein the transceiver is configured to receive a fourth message including transmission quality information from the reception apparatus, and transmit a fifth message including error correction information about the packet to the reception apparatus, and wherein the fourth message includes information about a propagation delay taken for a packet to arrive at the reception apparatus.

9. The apparatus of claim 8, wherein the fixed delay information is estimated based on a network delay, a delay of the pacing buffer, a delay of the de-jitter buffer, and a delay of an error correction buffer of the reception apparatus, and wherein the network delay is estimated based on the information about the propagation delay, the delay of the pacing buffer is estimated by dividing information about a number of packets buffered in the pacing buffer by a packet removal rate of the pacing buffer, and the delay of the error correction buffer is estimated based on the error correction information about the packet.

10. The apparatus of claim 7, wherein the buffer information includes information about a required size for buffer of the reception apparatus, and wherein in case that at least one of the buffer information or the fixed delay information is changed, the transceiver is configured to retransmit the first message.

11. The apparatus of claim 7, wherein the buffer information includes information about a required size for the buffer of the reception apparatus, and wherein in case that the required size for the buffer of the reception apparatus is decreased, the controller is configured to identify a packet estimated to be lost in the de-jitter buffer.

12. The apparatus of claim 11, wherein the transceiver is configured to transmit a retransmission packet of the packet estimated to be lost, the retransmission packet including a same transmission time stamp as included in the packet estimated to be lost.

* * * * *